United States Patent
Larsson (10) Patent No.: US 8,837,297 B2
(45) Date of Patent: Sep. 16, 2014

(54) NETWORK CODING BASED ON SOFT FEEDBACK

(75) Inventor: Peter Larsson, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 696 days.

(21) Appl. No.: 12/530,012

(22) PCT Filed: Dec. 3, 2007

(86) PCT No.: PCT/SE2007/050932
§ 371 (c)(1),
(2), (4) Date: Sep. 4, 2009

(87) PCT Pub. No.: WO2008/108700
PCT Pub. Date: Sep. 12, 2008

(65) Prior Publication Data
US 2010/0061259 A1    Mar. 11, 2010

(30) Foreign Application Priority Data
Mar. 6, 2007  (SE) .................... 0700584

(51) Int. Cl.
*H04H 20/71* (2008.01)
*H04L 12/863* (2013.01)
(Continued)

(52) U.S. Cl.
CPC ............ *H04L 1/20* (2013.01); *H04L 47/626* (2013.01); *H04L 47/522* (2013.01); *H04L 47/263* (2013.01); *H04L 47/14* (2013.01); *H04W 24/00* (2013.01); *H04L 2001/0097* (2013.01); *H04L 47/10* (2013.01); *H04L 49/90* (2013.01); *H04W 28/04* (2013.01); *H04L 47/38* (2013.01); *H04W 84/042* (2013.01); *H04L 47/26* (2013.01); *H04L 1/0026* (2013.01); *H04W 28/18* (2013.01)
USPC ......................... 370/241; 370/312

(58) Field of Classification Search
None
See application file for complete search history.

(56) References Cited

U.S. PATENT DOCUMENTS

2005/0007948 A1* 1/2005 Wan et al. .......... 370/208
2006/0171347 A1* 8/2006 Attar et al. .......... 370/328
(Continued)

FOREIGN PATENT DOCUMENTS

CN      1891008 A        1/2007
WO    2005043844 A2     5/2005
(Continued)

OTHER PUBLICATIONS

Aghadavoodi, J. et al. "Effective Block Recovery Schemes for ARQ Retransmission Strategies." 5th IEEE Internationals Symposium on Personal, Indoor and Mobile Radio Communications, vol. 2, pp. 781-785, Sep. 18-23, 1994.
(Continued)

*Primary Examiner* — Kevin C Harper
(74) *Attorney, Agent, or Firm* — Coats and Bennett, PLLC (57) ABSTRACT

A method (1000) for use in a communications system (100, 200, 400), with a first transceiver (110) which transmits data packets to a second (120) and a third transceiver (130). At least the second transceiver (120) can transmit (1010) to the first transceiver (100) a quality value regarding the reception quality of one or more data packets (300) which have been received by the second transceiver, which quality value the first transceiver (110) can use to modify (1015) its data transmissions. The second transmitter (120) listens for data packets intended both for itself and for said third transmitter (130), and the quality value which is transmitted by the second transceiver (120) is based on (1025) the reception quality of one or more of said data packets, and the reception quality value is expressed as (1030) one of a plurality of possible such values.

22 Claims, 10 Drawing Sheets

(51) Int. Cl.
*H04L 12/873* (2013.01)
*H04L 12/825* (2013.01)
*H04L 12/801* (2013.01)
*H04L 12/861* (2013.01)
*H04L 12/811* (2013.01)
*H04L 1/20* (2006.01)
*H04W 24/00* (2009.01)
*H04L 1/00* (2006.01)
*H04W 28/04* (2009.01)
*H04W 84/04* (2009.01)
*H04W 28/18* (2009.01)

(56) References Cited

U.S. PATENT DOCUMENTS

2007/0250638 A1 10/2007 Kiran et al.
2007/0253421 A1* 11/2007 Cai .............................. 370/394
2007/0258508 A1* 11/2007 Werb et al. ..................... 375/140
2008/0144552 A1* 6/2008 Johansson et al. ............. 370/310
2009/0227201 A1* 9/2009 Imai et al. ......................... 455/7

FOREIGN PATENT DOCUMENTS

| WO | WO 2006/085801 | * | 8/2006 | ............... H04L 1/00 |
| WO | WO 2006/098273 | * | 9/2006 | ............... H04L 1/00 |
| WO | 2007/008123 A1 | | 1/2007 | |
| WO | 2008/066421 A1 | | 6/2008 | |
| WO | 2008108708 A1 | | 9/2008 | |
| WO | WO 2006/071187 | * | 7/2009 | ............... H04B 7/15 |

OTHER PUBLICATIONS

Tau. C.-S. et al. "Performance Evaluation of the Loss-Collected Retransmission Scheme in Reliable Multicast Protocol." IEE Proc.-Commun., vol. 153, No. 3, pp. 376-382, Jun. 2006.
Yong, S., et al., "XOR Retransmission in Multicast Error Recovery", IEEE International Conference on Networks, Sep. 9, 2004, pp. 336-340.

* cited by examiner

$$e^{L_1(r_2,r_3)} = \frac{P(x_1=0|r_2,r_3)}{P(x_1=1|r_2,r_3)} = \frac{P(x_3=0|r_3)P(x_2=0|r_2) + P(x_3=1|r_3)P(x_2=1|r_2)}{P(x_3=0|r_3)P(x_2=1|r_2) + P(x_3=1|r_3)P(x_2=0|r_2)} = \frac{1+e^{L_2+L_3}}{e^{L_2}+e^{L_3}}$$

NETWORK CODING BASED ON SOFT FEEDBACK

TECHNICAL FIELD

The present invention discloses a method for use in a communications system in which there is a first sending node which can transmit data to at least a first and a second receiving node in the system. At least one of the first and second receiving nodes can transmit to the first sending node a value which is representative of regarding the reception quality of received data in the receiving node, which the first sending node can use to modify its transmissions to the receiving nodes.

BACKGROUND

The present invention is within the field of communications systems, particularly in systems where there is one node which has information to transmit to a plurality of other nodes in the system, a scenario which naturally is very common in, for example, cellular wireless networks, in which there is a number of users in a cell, and a "base station", i.e. a node which controls traffic to and from those users.

A natural goal in a communications system is to transfer information reliably and efficiently. So called Forward Error Correction, FEC, is often used to obtain efficient communications, whereas "classical" Automated Repeat Request, ARQ may be used to obtain reliability.

The reliability aspect ensures that the information will reach the receiving party, whereas the efficiency aspect will commonly ensure that this is done with the least energy or power cost. To meet the twin goals of both efficiency and reliability, Hybrid ARQ, HARQ, has been developed, which combines FEC with basic ARQ functions.

A drawback with the communications techniques described above is that they do not utilize the energy received by a receiving node in a particularly efficient manner, which adversely impacts the throughput of the system, as well as the system delay and the power and energy efficiency of the system.

SUMMARY

Thus, as has emerged from the description given above, there is a need for a solution by means of which a more reliable and efficient operation of a communications systems can be obtained.

Such a solution is offered by the present invention in that it discloses a method for use in a communications system in which there can be a plurality of transceivers.

In the system in which the invention may be applied, there can be a first transceiver which can transmit data packets to at least a second and a third transceiver in the system, and, according to the method of the invention, at least the second transceiver after storing a representation of the received data packets can transmit a quality value to the first transceiver, where the quality value is representative of the reception quality of one or more data packets which have been received by the second transceiver.

According to the invention, the first transceiver can use the quality value to modify its data transmissions, and the quality value which is transmitted by the second transceiver is representative of or based on the reception quality of one or more data packets which were intended for at least one of the transceivers in the system, and is expressed as one of a plurality of possible such quality values.

Thus, since the quality value which is transmitted by the second transceiver can be representative of the second transceiver's reception quality of a data packet which is intended for virtually any of the transceivers in the system, the energy used by the system may be utilized in a more efficient manner than in previous systems.

This and other advantages of the present invention will become even more apparent from the following detailed description.

In a preferred embodiment of the invention, the second transceiver transmits one quality value for each received data packet. Also, the quality value which is transmitted by the second transceiver may be representative of the reception quality of one or more data packets, at least part of which were intended for the second transceiver. Suitably but not necessarily, the quality value which is transmitted by the second transceiver can also include or be based on the channel quality at the second transceiver.

In another embodiment of the invention, the first transceiver can transmit data as composite packets, i.e. packets which combine one or more data packets intended for one or more of the transceivers in the system. In such an embodiment, a composite message may be coded so that decoding can be carried out to show which transceivers in the system that the composite message is intended for. Preferably, the coding can also comprise the application of a weight factor to the individual packets which are to be included in a composite packets.

The first transceiver may modify its data transmissions based on the quality values by adaptively scheduling the transmission of data packets based on received quality values, and/or by adaptively selecting data packets intended for individual transceivers in the system to be coded together, so as to optimize a performance measure in the system. The performance measure is preferably the system throughput. Alternatively, it would be possible to minimize the sum squared difference between the expected received quality values and the desired received quality values for the subsequent transmission.

The first transceiver can also modify its data transmissions by selecting the above mentioned weight factors so as to optimize a performance measure in the system.

In a system of the invention, the second and/or third transceiver in the system may decode a first received message by using a previously received second message in order to carry out the decoding, if at least one of the first and/or second messages is a composite packet.

BRIEF DESCRIPTION OF THE DRAWINGS

The invention will be described in more detail in the following, with reference to the appended drawings, in which.

DETAILED DESCRIPTION

Figure 1:
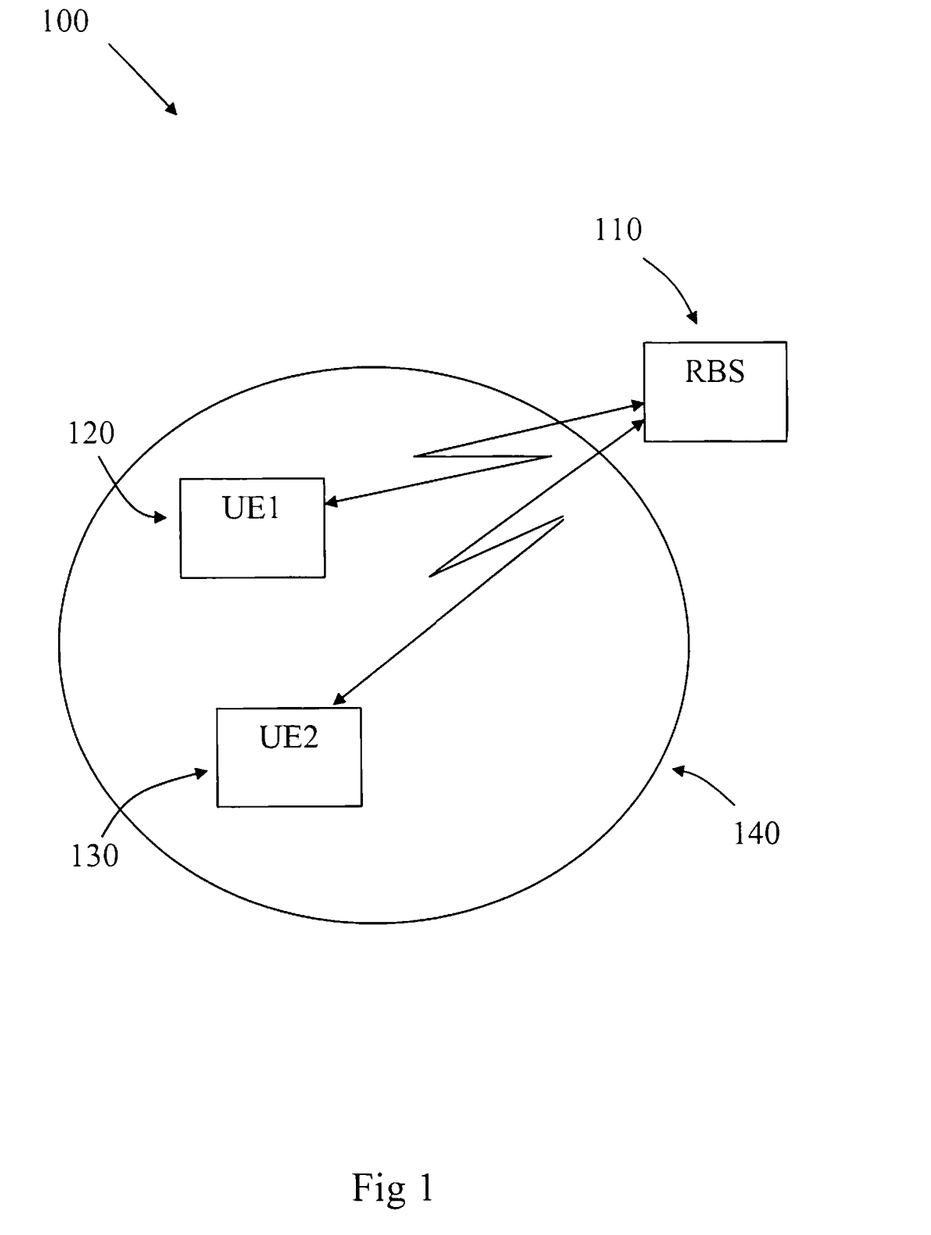
FIG. 1 shows a system in which the invention may be applied.

FIG. 1 shows a schematic overview of a system 100 in which the invention may be used. Thus, as can be seen, the invention is primarily intended for a 30 cellular wireless telecommunications system 100, in which there is a "base station", an RBS 110, which serves to control traffic to and from user terminals, UEs, in a cell 140 of the system. In FIG. 1, two UEs 120,130, are shown by way of example, but the number of UEs can of course vary.

However, although cellular telephony systems are the primary "target" of the invention, upon reading this text it will become evident to those skilled in the field of communications that the present invention may be applied to other fields of wireless communications as well, and in fact, the invention may also be applied to "wire-bound" systems in which there is a sender and a number of "subscribers" to which the sender wishes to transmit data.

Figure 2:
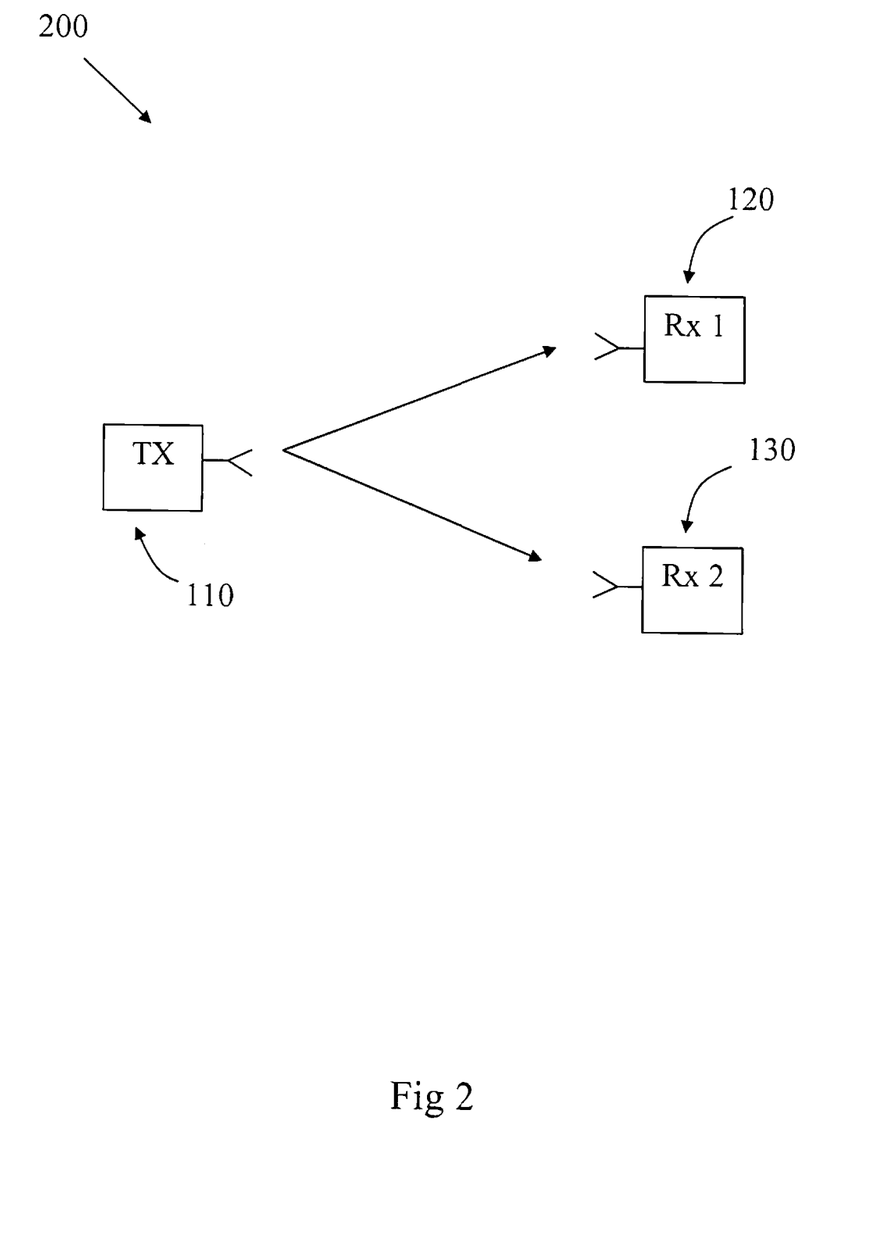
FIG. 2 shows a general system in which the invention may be applied.

Thus, the invention will from now on be described with the aid of drawings which depict a more generic system, such as the one shown in FIG. 2. The reference numbers from FIG. 1 have however been retained, for ease of reading and understanding. As can be seen, the system 200 of FIG. 2 comprises a first generic transceiver 110 which transmits data to a second and a third generic transceiver 120, 130.

As has been explained previously in this text, a goal of the present invention is to improve the energy utilization and thereby the data throughput of a wireless communications systems. However, before embarking on an explanation of how this is carried out, some terms which will be used in this text will now be defined:

Data Packet, DP: an entity which carries information. It should be understood 25 that information may be sent in other forms than a packet, and the term packet should thus here be seen as a generic term which could include for example such terms as signal, information streams/flows etc. As an example of a term which is encompassed by the term "data packet" in this text, the term "resource block" may be given, a term which is borrowed from OFDMA, 30 as used in 3GPP LTE, 3 Generation Partnership Project, Long Term Evolution.

Regular Packet, RP: a "plain" (data) packet, as used in e.g. systems which use ARQ, Automated Repeat Request.

Composite Packet, CP: a packet (or payload thereof) in which multiple RPs intended for multiple receiving parties are jointly coded together into a single packet. The coding may for example be a simple weighted linear addition in a finite or infinite field between full packets or substrings of packets. Non-linear encoding is also possible.

Generic Packet, GP: a general notation for either an RP or a CP.

Data Quality Information, DQI: a measure or a representation of the reception quality of a GP in a receiver. The DQI represents the level of decodeability of a GP, and may be represented by a scalar, a vector or even a matrix. In general, a scalar is suggested by the inventor of the present invention as being sufficient. In order to give some examples, the DQI may be a measure of the mean SINR (Signal to Interference Noise Ratio), the mean LLR (Log-Likelihood Ratio), or even the mean LLR as well as the variance of the LLR.

Higher order statistical moments of LLR than mean and variance, may also in addition be used, such as for example the third order moment to more precisely describe the probability density function of the LLR. The DQI may in this invention be for "own" packets, i.e. packets which are intended for the receiver which receives them, or the DQI can be for "overheard" packets, i.e. packets which are received by a first receiver but destined for a second receiver, or the DQI may also be for CPs which contain information destined for multiple receiving nodes, the "own" node being one of those or not. The DQI may also comprise ACK-messages which indicate that a packet has been decoded, since an ACK merely signals full and perfect decodeability. For example, in the case of a DQI which is represented as a scalar of b bits, one of the $2^b$ possible words may correspond to an ACK. It can be pointed out that an ACK can signify, depending on the coding of a GP, that an "own" packet, an overheard packet or a CP, i.e. a packet with shared information, has been correctly received.

Channel Quality Information, CQI: a measure of the instantaneous channel quality, expressed, for example, as the signal to interference to and noise ratio (SINR) or the mutual information (MI).

Returning now to the goal of the present invention, i.e. to improve upon the energy utilization of a communications systems, an initial and very basic explanation of how this goal is achieved, which will be elaborated upon more later in this text, is the following:

1. The receivers 120, 130 in the system supply the sender 110 in the system with so called "soft quality" feedback regarding regular and composite packets which have been transmitted by the sender and received by the receivers, and also comprising channel quality information, CQI,
2. Scheduling and coding operations of data packets in the sender 110 are based on the soft quality feedback information, and possibly also on CQI,
3. Combining and decoding of messages in the receivers is based on partly decoded "own" regular and composite packets, as well as on partly and fully decoded overheard and shared regular and coded composite packets.

Figure 3:
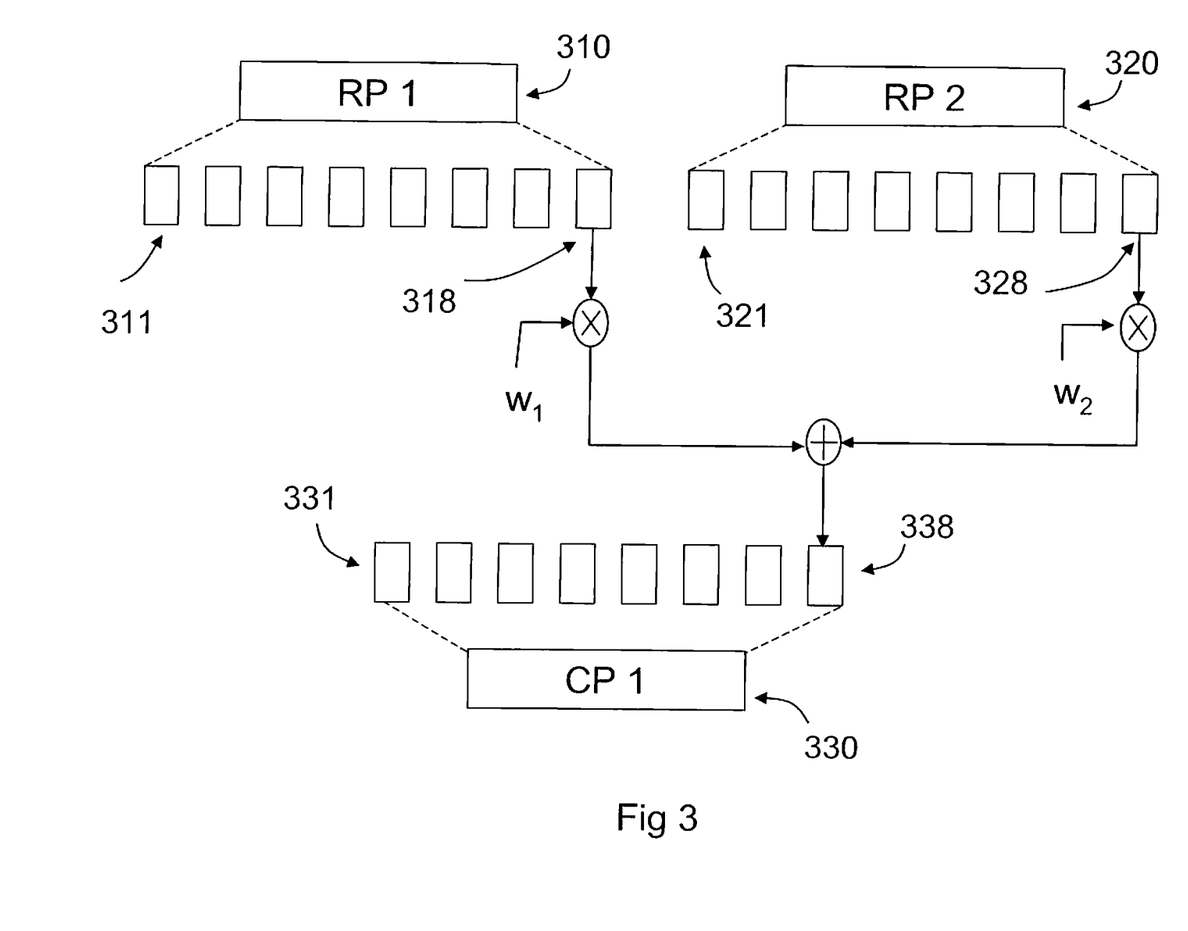
FIG. 3 shows an example of coding.

Thus, as has emerged from the description above, coding is used by a sender in a system of the invention (e.g. an RBS in a cellular telephony system) in order to combine RPs into CPs. FIG. 3 shows an example of a coding which is used by the sender in a preferred embodiment of the invention. A first regular data packet RP1 310 is shown, as well as a second regular data packet RP2 320. As can be seen, each of the RPs 310, 320 comprises a number of segments; in the example shown in FIG. 3 there are eight segments in each DP, which is of course only an example of the number of segments in a DP.

The size of each segment, i.e. the number of bits comprised in the segment, depends on the type of coding used. For example, if so called finite field addition is used, and more specifically, if the finite field is a so called Galois Field (GF), the size of the segment will depend on the size of the Galois field. If a $GF(2^8)$ is used, i.e. a GF with 256 different elements, then 8 bits are required for the finite field, and hence also for each segment. When using binary representation, i.e. only 0's and 1's, the finite field is GF(2), which yields a single bit segment. The addition in GF(2), as shown in FIG. 3, is a bitwise XOR operation. The number of segments depends on the number of bits to in each data packet and the finite field size. For example, with L bit packets, the number of segments is ceil(L/m) for $GF(2^m)$, where "ceil" is a function which rounds off upwards to the nearest integer.

As shown in FIG. 3, a first weighting factor $W_1$ is applied to each of the segments in the first data packet RP1, and a second weighting factor $W_2$ is applied to each of the segments in the second data packet RP2.

The two data packets RP1 and RP2 are added segment by segment in order to arrive at a Composite Package, shown as CP1, 330, in FIG. 3.

A mathematical representation of the coding shown in FIG. 3 is as follows:

$$C = W \cdot D \quad [1]$$

Here, C is a vector which represents all general packets sent so far per transmitter, D is a vector of all (regular) packets encoded into a composite packet so far and W is a weight matrix. When a row in the weight matrix W contains only one non-zero element, a regular packet is sent, whereas multiple non-zero elements correspond to a composite packet.

In equation [1], the operations may be done in an infinite field, e.g. continuous or discrete, but is preferably performed in a finite discrete fields such as a Galois field GF($p^m$), where p is a prime number and m is a positive integer greater than zero.

The invention is not limited to the coding shown in FIG. 3 and equation [1], other nonlinear coding schemes may also be used to merge/mix/code different pieces of information, in particular information designated to different users as is the case with the individual packets in the composite packets of the present invention.

Figure 4:
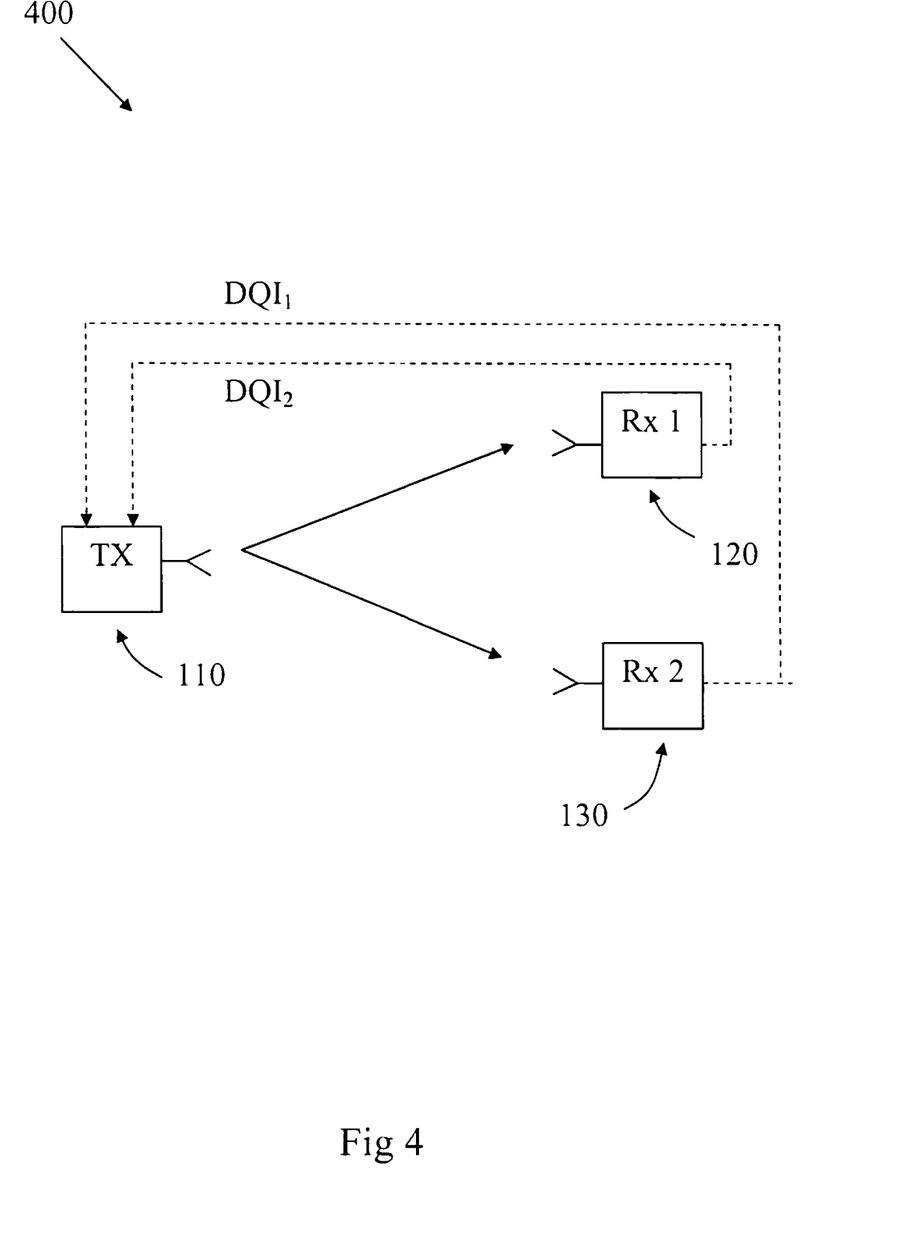
FIG. 4 shows a basic embodiment of a system of the invention.

FIG. 4 shows a generic system 400 of the invention, with the previous reference numbers retained. As can be seen in FIG. 4, a first sender 110 transmits GPs to a first and a second receiver $Rx_1$ 120, $Rx_2$ 130, and the first and the second receivers receive the GPs and attempt to decode them, potentially by using previously received GPs, a notion which will be explained in further detail below. In addition, the receivers 120, 130 transmit DQIs, Data Quality Index, to the transmitter 110 with DQI being representative of the reception quality in the receivers of the received GPs. Suitably, one DQI value is transmitted by each receiver for each GP which is received.

As will be explained in more detail in the following, the sender 110 uses the DQI values which it receives in order to schedule and code GPs, i.e. in this context to code regular packets into composite packets.

The notion of DQI as such has been explained above, but may be explained in further detail as follows: As described earlier, DQI is a measure which represents a GP's reception quality and is fed back from a receiver 120, 130, to the sender 110. Thus, in a system of the invention, a receiver such as the receiver 120, 130 shown in FIGS. 1 and 2 will comprise means for measuring the DQI, and for transmitting back to the sender a value representative of the measured DQI. The means for measuring the DQI will suitably comprise an analogue to digital converter, an ADC, in which the quality of the bits in a received bit stream or package can be measured or estimated as an aggregate for the whole packet.

Regarding the exact nature of the information which is fed back by the receiver to the sender, i.e. the DQIs, several embodiments are possible, including feedback of the quality per bit, or parameters which together with a known equation describe the estimated Probability Distribution Function and Cumulative Distribution Function, the PDF/CDFs of the "per bit quality" of a package. In addition, more compact statistical measures such as the moments of the estimated PDF/CDFs of the per bit quality (i.e. mean, variance etc.) are also possible to use in the present invention. Of course, feeding back per bit quality information would use a large amount of resources, and hence, more compact and resource efficient feedback formats like the PDF/CDF parameters or statistical moments are preferable. In particular, the mean of the quality is of interest to feedback. Further means of compressing information may also be used.

When discussing quality with respect to "per bit", two variants which are considered here are the coded bits and data bits. In the following, coded bits are used in a preferred embodiment as it allows for fast feedback without any latency incurred by decoding.

Regarding the quality measure used as DQI, assume that the quality measure could be the log-likelihood ratio (LLR) measure for each decoded bit (or alternatively the coded bits). The LLR, which is commonly used in the field of coding, is often defined by the following expression:

$$L_i = \ln \frac{P(x_i = 0 \mid r_i)}{P(x_i = 1 \mid r_i)} \quad [2]$$

In expression [2] above, P is the probability, x is the value of a transmitted bit, and r is the received value. The received value r may be affected by channel attenuation h and noise n, so that r=hs+n, and x can be mapped to, for example, a Binary PSK signal s, in which case x may assume the values +1 and −1, corresponding to the binary values x=0 or 1 respectively. It can be pointed out that the likelihood-ratio, LR or $L_i$ in [2] above, may sometimes be defined with the reciprocal of the probability ratios.

To further illustrate the concept of LLR, consider an Additive White Gaussian Noise, AWGN, channel which is a reasonable approximation of a wireless channel, i.e.:

$$r=hs+n \quad [3]$$

In [3] above, h is a complex gain factor (including the amplifier gain on the transmit side as well as the channel gain) and n is complex Gaussian noise with a variance of $\sigma^2$, and s is a value selected from a signal constellation such as given by Quadrature Amplitude Modulation (QAM), Phase Shift Keying (PSK) or any other modulation method. As an example, for the case of Pulse Amplitude Modulation, PAM, the LLR is then known to be:

$$LLR=re\{2h^*r/\sigma^2\} \quad [4]$$

Combining equations [2] and equation [4], and using x=0 shows that s=1 is transmitted, and using x=1 will show that s=−1 is transmitted.

As an alternative to using the estimated mean LLR value as DQI to feed back to the transmitter, it would be possible to instead use the signal to interference noise ratio (SINR) for a GP.

However, in the following, in order to facilitate the reader's understanding of the invention, but not thereby limiting the invention, it will be assumed that the mean LLR for a GP is used as the DQI for that GP.

Figure 5:
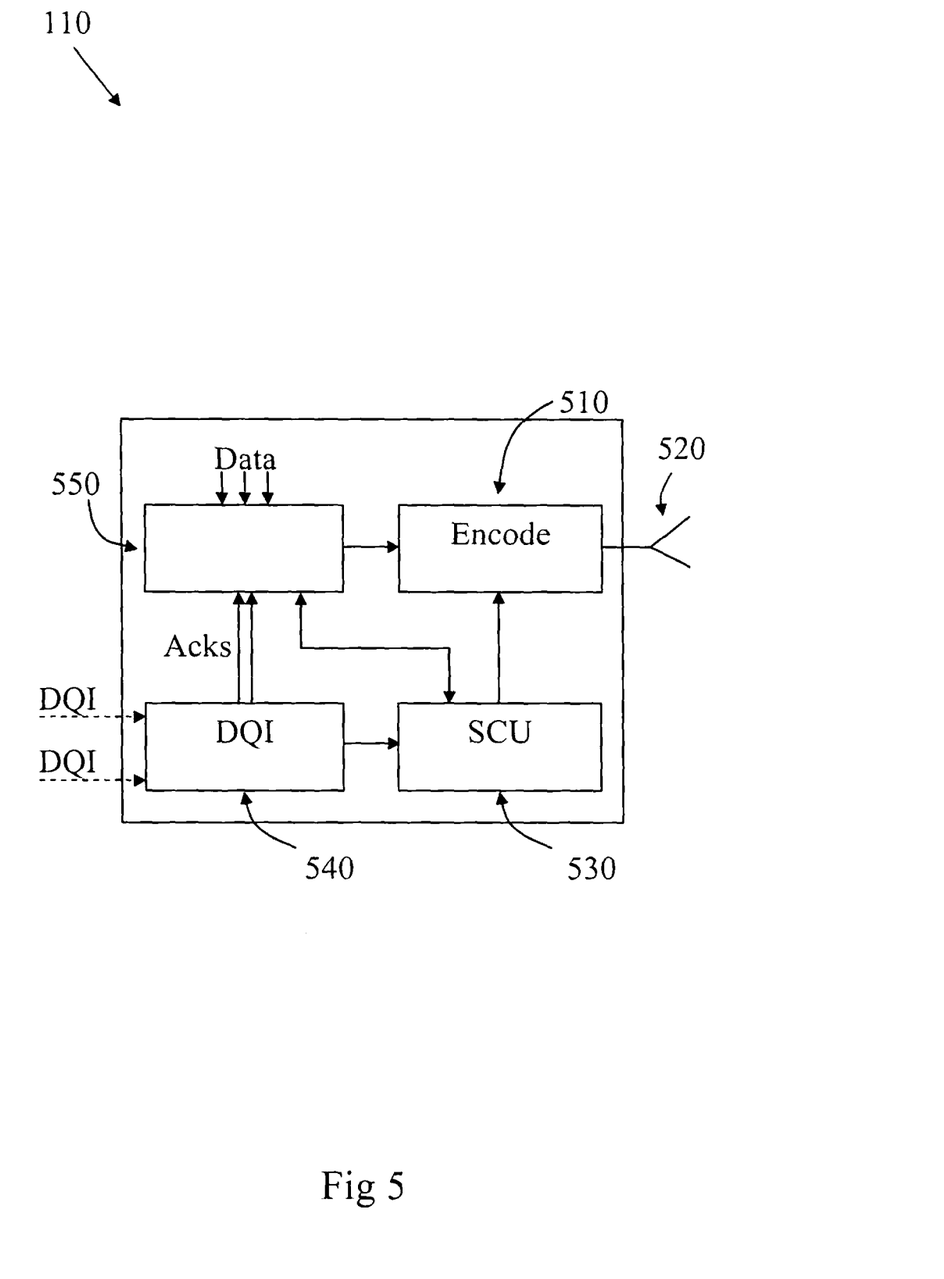
FIG. 5 shows a first transmitter structure of the invention.

A block diagram of functional blocks in a transmitter 110 of the invention is shown in FIG. 5. As can be seen in FIG. 5, the transmitter 110 comprises one block 540 which receives the DQIs from the receivers in the system, as well as comprising a scheduling and coding unit, SCU 530, and one unit 510 which encodes data before it is transmitted. In addition, the transmitter 110 also comprises a unit 550 which receives data for transmission, i.e. a unit which has one or more data buffers.

The unit 550 stores any packet to transmit until a packet has been received by the intended user. This can be found from feedback of acknowledgements of the composite or regular packets. The SCU 530 with knowledge of the content residing in 550, determines which packets to jointly encode and with what weights. Hence at transmission, the SCU 530 orders packets to be sent (or equivalently fetched and forwarded) to the encoder 510 where the encoding operation takes place. As shown in FIG. 5, the transmitter also comprises an antenna 520 for sending and receiving information to and from the other parties in the system.

The encoder 510 essentially works as has been described in connection with FIG. 3, and will therefore not be explained in more detail here. The function of the DQI unit 540 is basically to receive the DQI values from the receivers in the system, and to distribute the DQI values to the SCU 530 and the data unit 550.

The function of the SCU 530 is as follows: The SCU 530 decides which 5 packet or packets to send in the form of GPs and which code weights to use, to which end the SCU uses knowledge of what the data unit or buffer 550 contains, as well as a value which is representative of the reception quality of the previously transmitted GPs, i.e. the DQI values which have been received by the receiver 110.

A more mathematical explanation of the function of the SCU is as follows:

The task of the scheduling and coding unit, SCU 530, is to find the next GP, i.e. either a CP or a RP, to schedule for transmission. This is done based on at least the DQI feedback received, and knowing the coding used for the previously transmitted GPs for which the DQI is reported.

Denote the quality of each GP previously sent by the matrix $$Q_C \in R^{U \times J} \quad [5]$$

where U is the number of users and J is the number of transmitted GPs The coding that has been used in the transmissions is denoted by the coding matrix $$W \in Z^{J \times M} \quad [6]$$

where M is the number of data packets that have been sent, or rather, which are in the process of being sent.

Assuming first that each packet will be received by just one user, we use the vector $$q_D \in R^{U \times 1} \quad [7]$$

to represent the quality of data packet. This quality is then a function $f(\ldots)$ of W and $Q_c$ according to:

$$q_D = f(W, Q_C) \quad [8]$$

The estimate $q_D$ in the sender should reflect the quality which a receiver will have for a designated packet. Now, in case multiple users are interested in receiving one and the same GP, i.e. if the GP will comprise RPs destined for more than one receiver, one may generalize the notion of $q_D$ to a matrix $$Q_D \in R^{U \times M} \quad [9]$$

where certain elements corresponding to packets that are not designated to a specific user are indicated as void, and hence neglected. This then gives $$Q_D = f(W, Q_C) \quad [10]$$

It is possible to see $q_D$ as a special case of $Q_D$ where all elements but one in each row are indicated as void. Hence, $Q_D$ will be used in the following. If packets have been received by their designated receivers, they may (or should preferably) for complexity reasons not be included in $Q_D$.

When it comes to the issue of how $Q_D$ can be determined, one way is to perform decoding in the sender in the same way as in the receivers, based on W and $Q_C$, and potentially also by using knowledge of the information in the GPs. Iterative techniques like so called "belief propagation", or possibly a direct calculation technique could also be used.

The task of the SCU 530 is now to try and see which outgoing packets that should be encoded together, and which code weights that should be used for those packets.

To this end, one may define a tentative weight matrix $$W' \in Z^{T \times M'} \quad [11]$$

which is comprised of a set of elements in the field for which the matrix may be defined. Here, T is a number from one and up to the maximum number of GPs which the SCU plans for, which allows one or potentially more GPs to be scheduled. M' is the number of data packets that is planned for sending, so that potential new packets may be added. Based on this, an estimated future version of the $Q_D$ can be written as a function of W', apart from obviously being dependent on W and $Q_C$, i.e.:

$$Q_D(W') = f(W, W', Q_C) \quad [12]$$

The expression of [12] is an estimate of a future outcome of transmitted GPs. While $Q_C$ may hold sufficient information to predict the quality of the channel, it is also possible to use a more explicit expression than [12], if more details are known about the channel. Hence an alternative formulation is $$Q_D(W') = f(W, W', Q_C, X) \quad [13]$$

In [13], X also contains one or more of such information as instant/average channel gain information, channel gain to noise (and interference) information etc. The optimal coding matrix W'* is now determined through $$W'^* = \arg \underset{\forall W' \in S_{W'}}{opt} f_{W'}(Q_D, Q_D(W')) \quad [14]$$

where $W' \in S_{W'}$ and $S_{W'}$ define the space of permissible code matrices, depending on what is optimized and $f_{W'}(\ldots)$ is a so called objective function. In [14], the term "opt" means the operation of optimization which may be either the minimum or the maximum of the function.

In order to obtain the objective function $f_{W'}(\ldots)$ in practice, a few factors which need to be considered are the desired throughput, "degree of fairness", and possibly also the degree of QoS (Quality of Service) support.

A few exemplary embodiments of the objective function will be given below. In a first approach, it is of interest to maximize the overall quality improvement, since this should have a positive impact on the overall throughput. The code matrix is then found by the operation $$W'^* = \arg \underset{\forall W' \in S_{W'}}{\max} \|Q_D(W') - Q_D\|_p, \quad [15]$$

where the void matrix elements are neglected, and $$\|\ldots\|_p \quad [16]$$

is the P-norm with e.g. P=1, 2, ∞. With P=1, this is equivalent to maximizing the mean quality improvement.

Another method is based on the fact that that we want the quality for a RP to progress in a time dependent fashion from the point in time when the RP was first sent (or first received and placed in a transmission buffer). If this point in time is referred to as t, we get a time dependent function for $h_{um'}(t)$, where u and m represent the indexes used in $Q_D(W')(u, m')$:

$$W'^* = \arg$$

$$\underset{\forall W' \in S_{W'}}{\min} \sum_{m'=1}^{M'} \sum_{u=1}^{U} \begin{cases} h_{um'}(t) - Q_D(W')(u, m'), & \text{if } h_{um'}(t) > Q_D(W')(u, m') \\ 0, & \text{otherwise} \end{cases}$$

the equation above being numbered as [17].

One could also consider various methods involving relative improvements, and in such a case, a version of the expression above would be:

$$W'^* = \arg \underset{\forall W' \in S_{W'}}{\max} \|(Q_D(W') - Q_D) \div Q_D\|_p \quad [18]$$

where the operation ÷ means element-wise division. This ensures improved fairness in that low quality links are also scheduled. In particular, this could be beneficial with channel dependent scheduling where channel fading peaks can be exploited.

Other scheduling and coding algorithms are of course possible, as will be realized by those skilled in the art.

Figure 6:
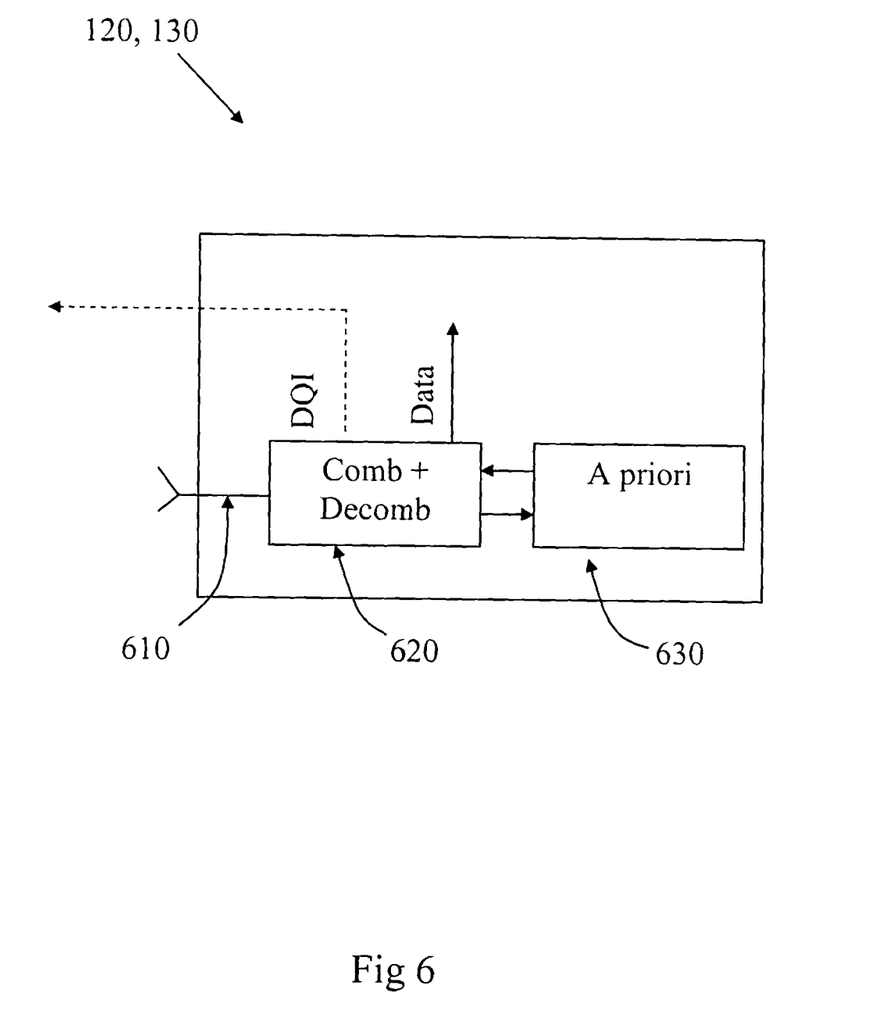
FIG. 6 shows a first receiver structure of the invention.

FIG. 6 shows a schematic block diagram of a receiver for use in the invention, such as the UEs 120,130 shown in FIGS. 1, 2 and 4. As can be seen in FIG. 6, the receiver, or rather transceiver, 120, 130, comprises an antenna 610 for exchanging information with the sender (RBS in a cellular system) of the system, a combining and de-combining block 620 and an "a priori block" 630. The function of the antenna 610 is self evident, i.e. to aid in the transmission and reception of data. The function of the blocks 620 and 630 is as follows:

The transceiver 120, 130 attempts to decode any and all packet it receives. In so doing, it may need to use a priori information of previously received and stored RPs and/or CPs, i.e. GPs. Typically, this a priori information is LLR information per bit, or just digitized received symbols, but the a priori information may also be correctly decoded or partly decoded information for overheard packets destined for other users in the system. The a priori information for previously received GPs is thus stored in a memory in the receiver, suitably in the a priori block 630, and may preferably be improved upon by updates when a GP is received by the transceiver 120, 130.

A basic idea in the transceiver 120, 130 of the invention is to perform decoding and combining of pieces of information such as, for example, GPs. The GPs should have been received on least at two different occasions, with intermediate feedback to the transmitter having been carried out by the transceiver at least once.

The central idea is to enhance information destined for oneself, i.e. the transceiver 120, 130, by using some or all of the following:
- soft undecoded information destined for the own transceiver.
- soft undecoded overheard information, i.e. information destined for other transceivers,
- soft undecoded "mixed" information, i.e. CPs in which at least part of the packets are destined for the own transceiver,
- decoded overheard information destined for other users,
- decoded mixed information, i.e. in the form of CPs.

Note that some GPs may not only be classified as information destined for the "own" transceiver or for other transceivers in the system, but rather, as in the case of multicasting, the information may be designated for several nodes or transceivers in the system.

Combining

One way of combining GPs is by so called Chase combining. Denoted the chase combining used here as "Chase combing based Multi User HARQ", since chase combining based HARQ is known. In our case, packets are coded into composite packets, CPs, as described previously in this text.

We exemplify with the operation of coding in a Galois Field (3), GF(2), but this is as an example only, the invention is in no way limited to this case. Assume that for each bit of a packet $D_1$ where $C_1=D_1$, (where "C" is C of equation [1] above) designated for a user $u_1$, and a packet $D_2$ where $C_2=D_2$ designated for a user $u_2$, the combining and decoding block 620 in the transceiver 120, 130 forms (i.e. encodes) a composite packet $C_3=D_1 \oplus D_2$ in GF(2), i.e. bitwise XOR. Let's focus on $u_1$ and assume that it receives degraded versions of $C_1$, $C_2$, $C_3$, and based on this $u_1$ wants to estimate $D_1$.

Let's now calculate and update an improved LLR value for $D_1$. First, one can see that it is possible to equivalently write $D_1=C_3 \oplus D_2$. We can obtain the likelihood ratio based on the observations of received generic packet $C_2$ and $C_3$, i.e. $r_2$ and $r_3$ respectively. The resulting equation, here referred to as equation 3, is shown in appended FIG. 7.

Figure 7:
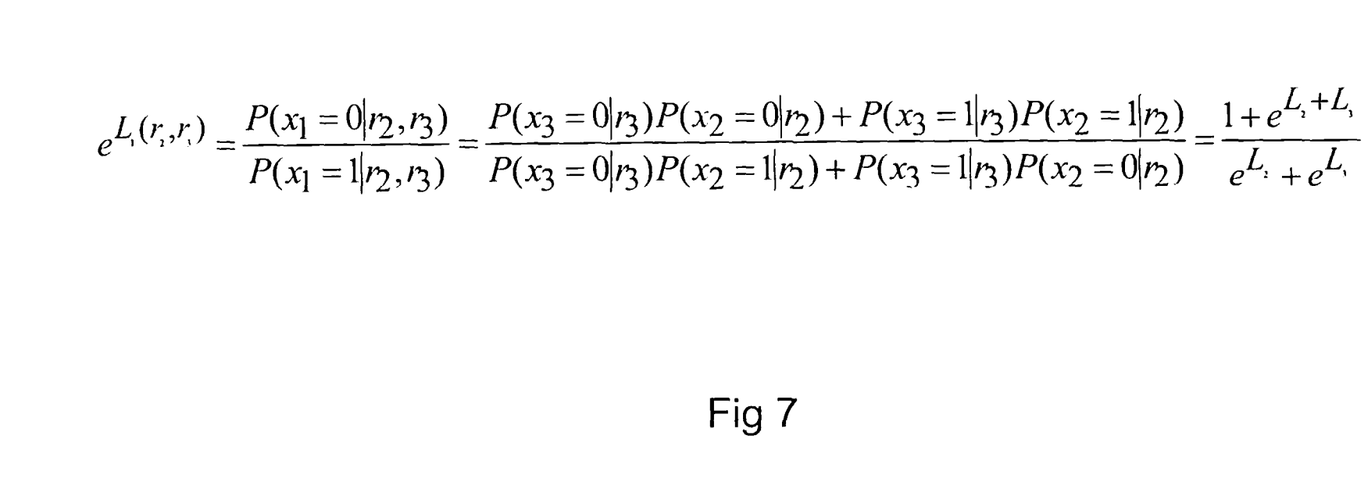
FIG. 7 shows an equation.

In the rightmost side of equation 3, (2) has been used. Now, equation 3 allows an updated (per bit) LLR for $D_1$ to be calculated, as shown in (4) below.

$$L'_{11} = L_{11} + \ln \frac{1 + e^{L_{21}+L_{31}}}{e^{L_{21}} + e^{L_{31}}} \qquad [19]$$

In (4), we have introduced a notion $L_{ju}$ for the LLR indicating which $j^{th}$ GP, $j \in \{1,2\}$ packet it is and which $u^{th}$ node that receives it.

Similarly, user 2 may update and improve its "log-likelihood" (for each respective bit) by using:

$$L'_{22} = L_{22} + \ln \frac{1 + e^{L_{12}+L_{32}}}{e^{L_{12}} + e^{L_{32}}} \qquad [20]$$

Decoding

One example of a decoding method which may be used in a transceiver of the present invention is so called "Incremental redundancy": For incremental redundancy based MU-HARQ, the well known so called "belief propagation algorithm", also sometimes referred to as "the message passing algorithm" may be used for decoding. The benefit of using belief propagation is that it does not limit the system of the invention to simple bitwise XOR-operations between packets, other codes such as for example convolution codes, turbo codes, LDPC codes etc could be used. Another benefit in general for incremental redundancy is that additional coding gain is obtained, which improves the performance, or alternatively, the same performance level can be achieved at lower SNRs.

In an alternative embodiment, one or more of the receivers in the system can transmit not only DQI but also CQI, Channel Quality Indicator, to the transmitter in the system. The CQI is a measure of the channel quality, and is preferably expressed as Signal to Interference and Noise Ratio (SINR) or Signal to Noise Ratio (SNR).

Figure 8:
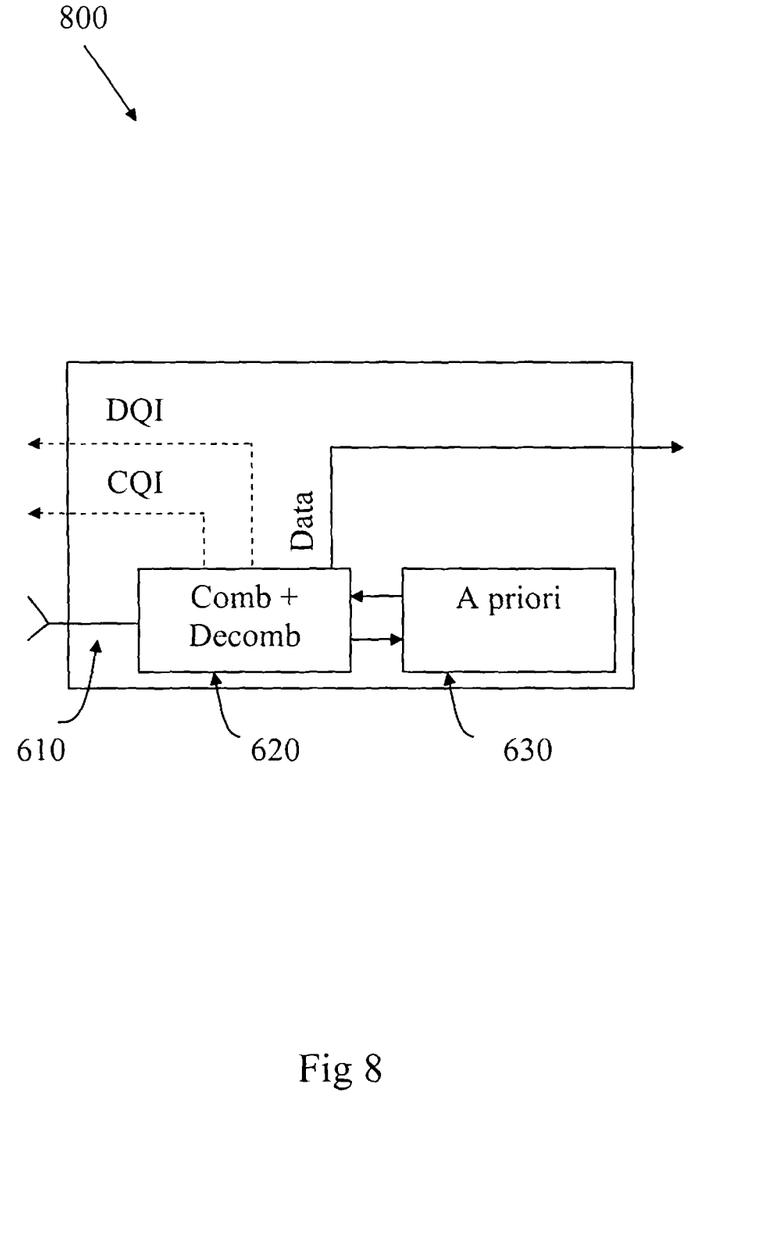
FIG. 8 shows a first transceiver structure of the invention.

FIG. 8 shows an embodiment of a receiving transceiver for example for use as a UE in the system shown in FIGS. 1, 2 and 4. The transceiver 810 is similar to the one shown in FIG. 6, and the components already shown in FIG. 6 have retained their reference numerals.

As indicated in FIG. 8, the transceiver 810 comprises means for measuring and transmitting the CQI to the transmitter in the system. These "CQI-means" are suitably comprised in the combining and decombining unit 620 of the transceiver 810.

Figure 9:
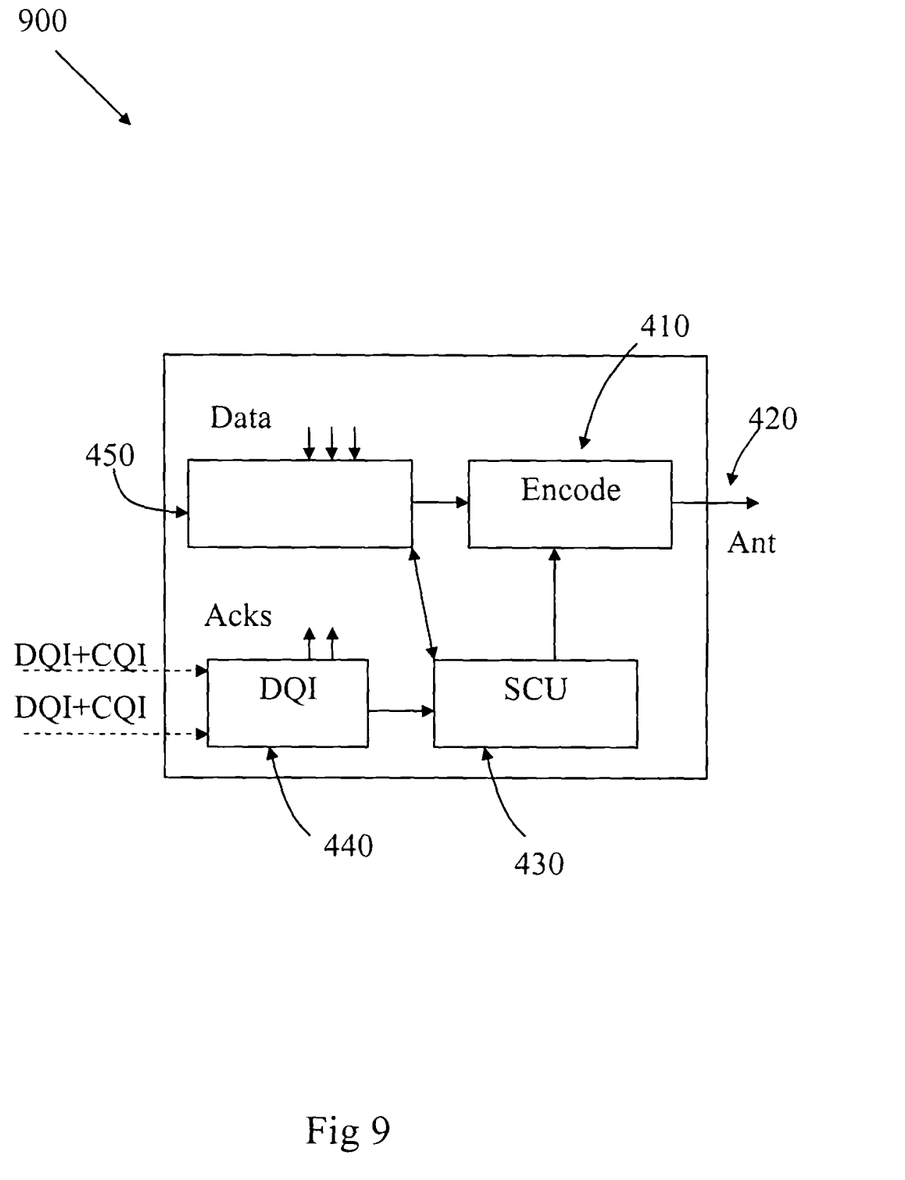
FIG. 9 shows a second transceiver structure of the invention.

FIG. 9 shows a transceiver 910 which may be used as a transmitter together with the receiving transceiver 810 of FIG. 8. The transceiver 910 is similar to the one shown in FIG. 5, and the components already shown in FIG. 5 have retained their reference numerals. As indicated in FIG. 9, the transmitter 910 comprises means for using the CQI as "soft" input together with the DQI.

The sender may further, when it decides which packet to code together based on DQI, also take into account CQI information representative of the current or predicted channel quality. For example, missing packets and packets, which based on the DQI are deemed suitable to send to users, may be coded together if the instantaneous CQI to the users are above the mean CQI. Hence, a good channel opportunity is taken if, for example, a channel fades up.

Figure 10:
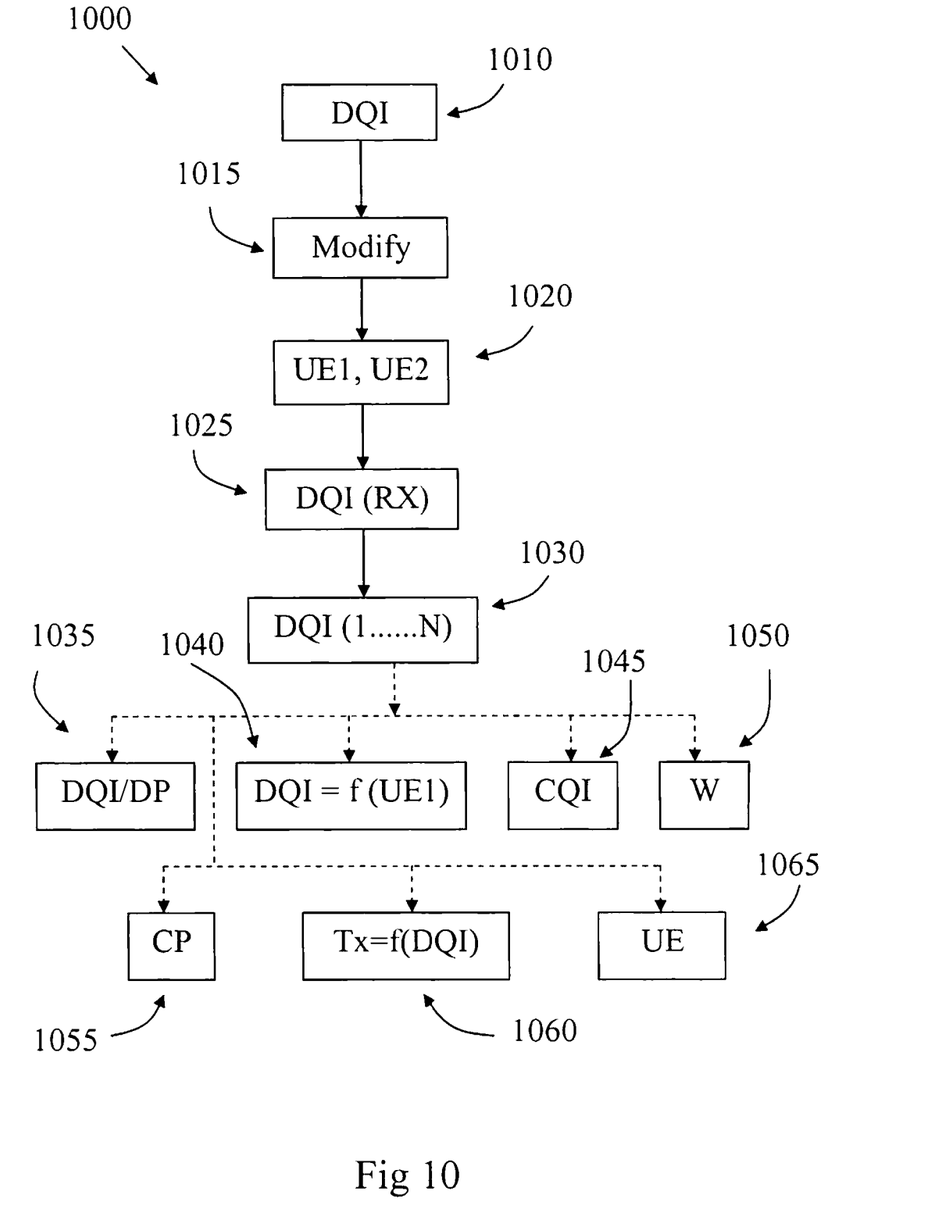
FIG. 10 shows a flow chart of a method of the invention.

FIG. 10 shows a rough flow chart of a method 1000 of the invention. As has emerged from the text above, the method 1000 of the invention is intended for use in a communications system such as the ones 100, 200 and 400 which are shown in FIGS. 1, 2 and 3, and described in connection with those drawings.

Thus, in the system in which the invention is applied, there can be a plurality of transceivers, with a first transceiver which can transmit data packets to at least a second and a third transceiver in the system. As shown in step 1010 in FIG. 10, according to the inventive method at least the second transceiver can store a representation of the received data packets and then transmit a quality value such as a DQI to the first transceiver which is representative of the reception quality of one or more data packets which have been received by the second transceiver.

The quality value can be used by the first transceiver to modify its data transmissions, as shown in step 1015, and as shown in step 1020, the second transceiver will listen for data packets intended both for itself and for the third transceiver. As shown in step 1025, the quality value which is transmitted by the second transceiver is representative of the reception quality of one or more data packets, and step 1030 shows that the reception quality value is expressed as one of a plurality of possible such values, i.e. it is chosen from a range of such value. The modification of the data transmission according to the invention at least comprises selecting weights for encoding packets into composite packets and choosing which packets to send. A further possible modification in addition to the weight and packet selection would be to adapt coding, modulation and other transmission parameters.

Step 1035 shows that the second transceiver may preferably but not necessarily transmit one quality value for each received data packet, and step 1040 indicates that the quality value which is transmitted by the second transceiver may be representative of the reception quality of one or more data packets, at least part of which were intended for the second transceiver, As indicated in step 1045, the second transceiver can, in one embodiment of the invention, also transmit to the first transceiver a value, for example a CQI, regarding the channel quality from the first transceiver to the second transceiver based on e.g. estimating the channel quality from channel estimation symbols (also known as pilot signals or reference symbols), a value which the first transceiver also uses to modify its data transmissions, together with the value which is representative of the reception quality value, i.e. the DQI.

Step 1055 shows that the first transceiver can transmit its data as composite packets, i.e. packets in which one or more data packets intended for one or more of the transceivers in the system are combined by coding, and suitably a composite message is coded so that decoding may show which transceivers in the system that the message is intended for.

As shown in step 1050, the coding of the data packets may also comprise applying a weight factor to the individual packets to be included in a composite packet.

According to the inventive method, the first transceiver may also modify its data transmissions by adaptively scheduling the transmission of data packets based on received quality values, or by adaptively selecting data packets intended for individual transceivers in the system to be coded together, so as to optimize a performance measure in the system. In addition, the modification can be done by selecting the weight factors so as to optimize a performance measure in the system.

As shown in step 1065, the second and/or third transceiver in the system in which the invention is applied may decode a first received message by using a previously received second message in order to carry out the decoding, if at least one of said first and second messages is a composite message. In the decoding, the received data message which was modified based on reception quality value information DQI is combined and/or decoded together with one or more previously received messages.

The invention is thus directed towards a method as described above in connection with FIG. 10, but the invention is also directed towards the components in the systems shown in FIGS. 1, 2 and 4, i.e. the receiving transceivers of FIGS. 6 and 8 and the sending transceiver of FIGS. 5 and 9.

Hence, a receiving transceiver 120, 810, of the invention is intended for use in a communications system such as the ones 100, 200, 400 of FIGS. 1 2 and 4, in other words systems in which there can be a plurality of transceivers with a sender which can transmit data packets to a plurality of receiving transceivers. The inventive receiving transceiver 120, 810, is equipped with means for storing a representation of the received data packets and for transmitting to the sender a quality value representative of the reception quality of one or more data packets 300 which have been received by the transceiver, which means may be incorporated in the combining and decoding means 620, although they can also be separate means.

The transceiver 120, 810, also comprises means for listening for data packets intended both for itself and for at least one other party such as the transceiver 130 in the system, and the quality value which is transmitted by the transceiver 120, 810 is a representation of the reception quality of one or more data packets, and is expressed as one of a plurality of possible such values. These listening means may also be included in the combining and decoding means 620, but can also be separate means.

In a preferred embodiment, the transceiver 120, 810, will transmit one quality value for each received data packet, and the quality value may represent the reception quality of one or more data packets, at least part of which were intended for the transceiver 120, 810, i.e. for the transceiver itself and not for other parties in the system.

The inventive transceiver may also, as shown in FIG. 8, be able to transmit to the sender a value regarding the channel quality at the transceiver measured on e.g. pilot signals or "blindly" on received data. The channel quality measure may be an instantaneous representation of the channel quality or a predicted value for some time forward in time.

In one embodiment, the transceiver 120, 810, can also receive and decode data as composite packets, i.e. packets in which one or more data packets intended for one or more of the transceivers in the system are combined by coding, so that decoding may show which transceivers in the system that the message is intended for. Such a transceiver may be able to decode a first received message by using a previously received second message in order to carry out said decoding, where at least one of said first and second messages is a composite message.

Suitably, the transceiver 120, 810 is a user terminal intended for a cellular wireless system such as the GSM, WCDMA, CDMA-2000, LTE, LTE-Advanced, 802.16 (WiMax) systems, but also e.g. WLAN system such as 802.11.

Turning now to the sending transceiver 110, 910 of FIGS. 5 and 9, such a transceiver is, as has emerged from the description above, intended for use in a communications system such as the ones 100, 200, 400 of FIGS. 1, 2 and 4, i.e. a system in which there can be a plurality of receiving transceivers, and the sending transceiver 110, 910 of the invention is able to transmit data packets to at least a second and a third receiving transceiver in the system, such as the transceivers 120,130 shown in FIGS. 1, 2 and 4.

The inventive transceiver 110, 910 is able to receive from at least one of the receiving transceivers in the system a quality value representative of the reception quality of one or more data packets which have been received by the receiving transceiver, and the inventive transceiver 110, 910 can use the quality value to modify its data transmissions, the reception quality value being expressed as one of a plurality of possible such values. In addition, the sending transceiver 110, 910 can transmit data as composite packets, i.e. packets in which one or more data packets intended for one or more of the transceivers in the system are combined by coding.

In a preferred embodiment, the sending transceiver 910 can also receive from the receiving transceiver a value regarding the channel quality at the receiving transceiver for estimated channel quality, and this channel quality value can be used by the sending transceiver to modify its data transmissions. In addition, the sending transceiver can have the ability to code a composite message so that decoding of such a message may show which transceiver or transceivers in the system that the message is intended for. This coding can also comprise the application of a weight factor to the individual packets which are to be included in a composite packet.

In one embodiment, the sending transceiver 110, 910 can modify its data transmissions by adaptively scheduling the transmission of data packets based on received quality values, and/or by modifying its data transmissions by adaptively selecting data packets intended for individual transceivers in the system to be coded together, in order to optimize a performance measure in the system. The modification of data transmissions by the sending transceiver can also include selecting the weight factors, so as to optimize a performance measure in the system.

Suitably, the sending transceiver 110, 910 of the invention is a Base Station for a cellular wireless system such as the GSM, WCDMA, CDMA-2000, LTE, LTE-Advanced, 802.16 (WiMax) systems but also e.g. WLAN system such as 802.11.

The invention is not limited to the examples of embodiments described above and shown in the drawings, but may be freely varied within the scope of the appended claims.

The invention claimed is:

1. A method operative in a communications system comprising a plurality of transceivers, including a first transceiver operative to transmit data packets to at least a second and a third transceiver in the system, comprising, at least at said second transceiver:
   receiving and storing a first data packet transmitted from the first transceiver;
   transmitting to the first transceiver a quality value representative of the reception quality of one or more data packets received by the second transceiver, for use by the first transceiver to modify its data transmissions;
   listening for data packets intended both for itself and for at least said third transceiver transmitted from the first transceiver;
   receiving, from the first transceiver, at least one composite packet comprising a combination of data packets intended for both itself and for at least said third transceiver jointly coded together into a single composite packet, wherein the data packets in the combination are selected based on the quality value; and
   decoding the composite packet by using the first received data packet.

2. The method of claim 1 wherein the second transceiver transmits one quality value for each received data packet.

3. The method of claim 1 wherein the quality value transmitted by the second transceiver is representative of the reception quality of one or more data packets, at least part of which were intended for the second transceiver.

4. The method of claim 1 further comprising, at least at the second transceiver:
   transmitting to the first transceiver a value regarding the channel quality at the second transceiver for a received packet; and
   wherein the first transceiver also uses the channel quality value to modify its data transmissions.

5. A first transceiver in a communications system operative to transmit data packets to at least a second and a third receiving transceivers, the first transceiver configured to:
   transmit a first data packets to at least one of said receiving transceivers;
   receive, from at least one of said receiving transceivers, a quality value representative of the reception quality of one or more data packets which have been received by at least one of said receiving transceivers;
   modify its data transmissions based on the quality value;
   transmit data as composite packets, in which one or more data packets intended for at least two different receiving transceivers in the system are selected based on the quality value and are combined by jointly coding the data packets intended for different transceivers into a single composite packet by, for each of a plurality of data segments within the data packets, applying a weighting factor to each segment and combining corresponding weighted data segments from the data packet intended for each of the at least two different receiving transceivers into a data segment of the composite packet.

6. The first transceiver of claim 5 wherein the first transceiver is further operative to code a composite message such that decoding indicates which transceiver or transceivers in the system each data packet is intended for.

7. The first transceiver of claim 6 wherein the first transceiver is further operative to apply a weight factor to the individual packets to be included in a composite packet.

8. The first transceiver of claim 6 wherein the first transceiver is further operative to modify its data transmissions by adaptively scheduling the transmission of data packets based on received quality values.

9. The first transceiver of claim 6 wherein the first transceiver is further operative to modify its data transmissions by adaptively selecting data packets intended for individual transceivers in the system to be coded together, so as to optimize a performance measure in the system.

10. The first transceiver of claim 7 wherein the first transceiver is further operative to selecting the weight factors so as to optimize a performance measure in the system.

11. A method operative in a communications system comprising a plurality of transceivers, including a first transceiver operative to transmit data packets to at least a second and a third transceiver in the system, comprising, at said first transceiver:
   transmitting a first data packet to the second transceiver;
   receiving from the second transceiver a quality value representative of the reception quality of one or more data packets received by the second transceiver; and selecting data packets intended for both the second transceiver and for at least the third transceiver based on the quality value for combining into a composite packet; and
combining the selected data packets by jointly coding them into the composite packets by, for each of a plurality of data segments within the data packets, applying a weighting factor to each segment and combining corresponding weighted data segments from the data packets intended for the second and third transceivers into a data segment of the composite packet; and
transmitting at least one composite packet to the second transceiver.

12. The method of claim 11 wherein combining data packets intended for both the second transceiver and for the third transceiver into one or more composite packets comprises combining the data packets by coding.

13. The method of claim 12 wherein combining the data packets by coding comprises coding the data packets such that decoding reveals the transceivers in the system for which the packets are intended.

14. The method of claim 12 wherein combining the data packets by coding further comprises applying a weight factor to the individual packets to be included in the composite packet.

15. The method of claim 14 further comprising selecting the weight factor so as to optimize a performance measure in the system.

16. The method of claim 11 further comprising:
in response to the quality value, adaptively scheduling the transmission of data packets.

17. The method of claim 11 further comprising:
in response to the quality value, adaptively selecting data packets intended for individual transceivers in the system to be combined into a composite packet, so as to optimize a performance measure in the system.

18. A second transceiver in a communications system comprising a first transceiver operative to transmit data packets to at least the second transceiver and a third transceiver, the second transceiver configured to:

receive and store a first data packet transmitted from the first transceiver;
transmit to the first transceiver a quality value representative of the reception quality of one or more data packets received by the second transceiver, for use by the first transceiver to modify its data transmissions;
listen for data packets intended both for itself and for at least said third transceiver transmitted from the first transceiver;
receive, from the first transceiver, at least one composite packet comprising a combination of data packets intended for both itself and for at least said third transceiver jointly coded together into a single composite packet, wherein the data packets in the combination are selected based on the quality value; and
decode the composite packet by using the first received data packet.

19. The second transceiver of claim 18 wherein the second transceiver is further configured to transmit one quality value for each received data packet.

20. The second transceiver of claim 18 wherein the quality value transmitted by the second transceiver is representative of the reception quality of two or more data packets received by the second transceiver.

21. The second transceiver of claim 18 wherein the second transceiver is further configured to:
transmit to the first transceiver a value regarding the channel quality at the second transceiver for a received packet for use by first transceiver to modify its data transmissions.

22. The second transceiver of claim 18 wherein the second transceiver is further operative to receive and decode data as composite packets in which one or more data packets intended for one or more of the transceivers in the system are combined by coding, such that decoding indicates which transceivers in the system each data packet is intended for.

* * * * *